Patented May 19, 1925.

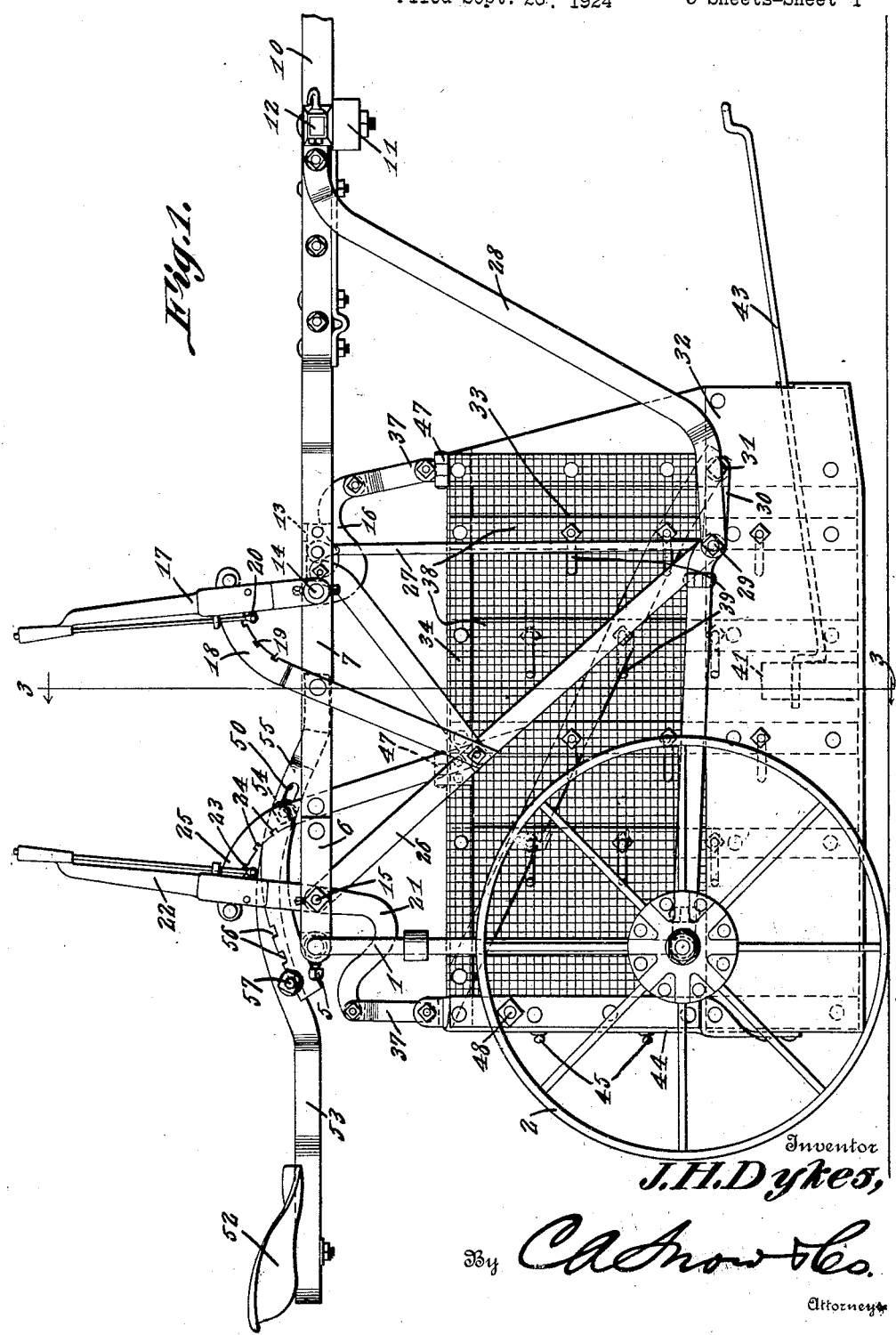

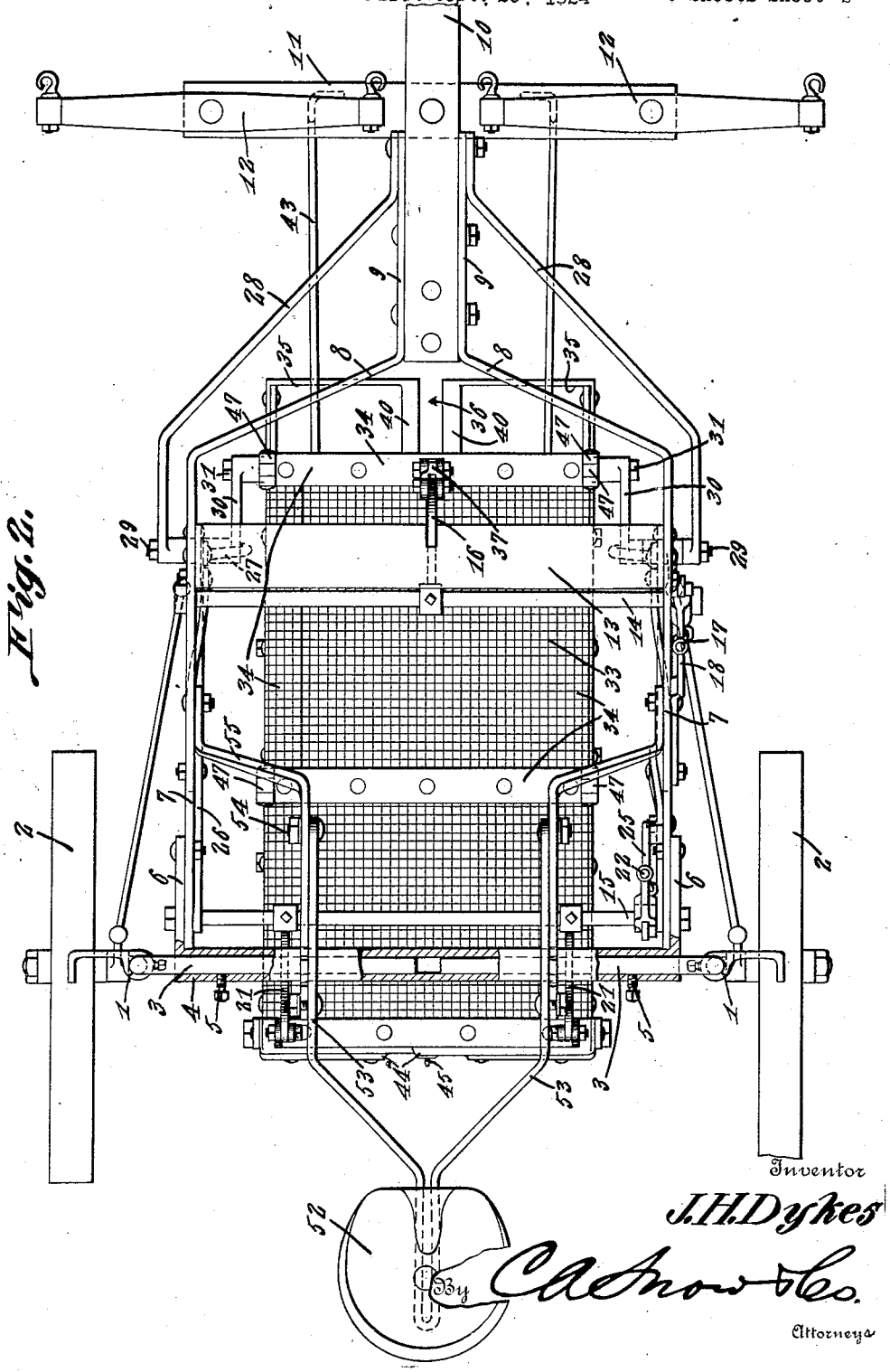

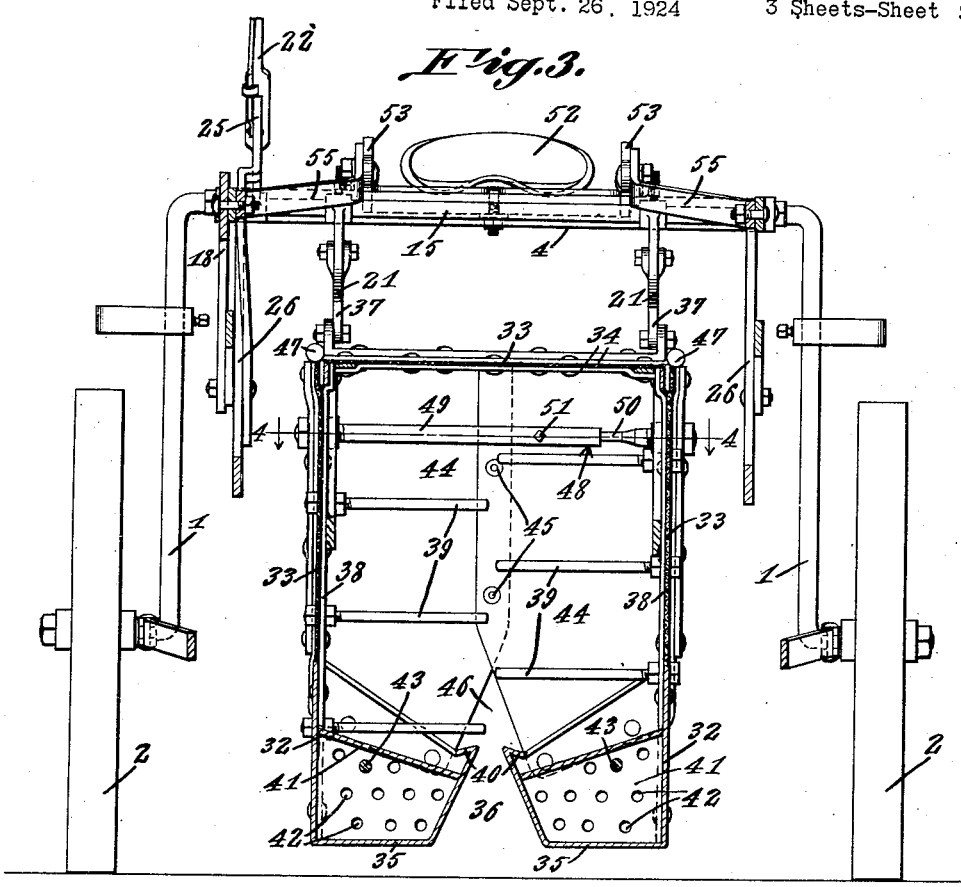
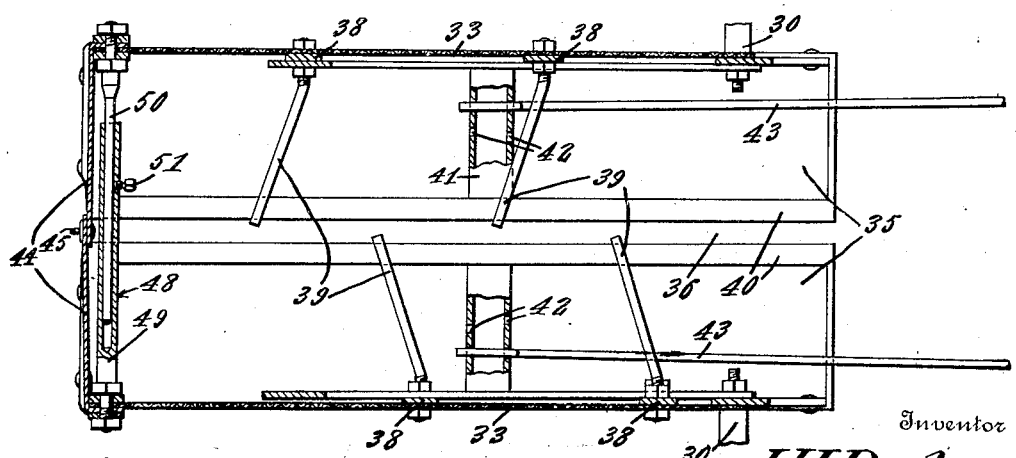

1,538,100

UNITED STATES PATENT OFFICE.

JOHN H. DYKES, OF DONALSONVILLE, GEORGIA.

BOLL-WEEVIL CATCHER.

Application filed September 26, 1924. Serial No. 740,074.

*To all whom it may concern:*

Be it known that I, JOHN H. DYKES, a citizen of the United States, residing at Donalsonville, in the county of Decatur and State of Georgia, have invented a new and useful Boll-Weevil Catcher, of which the following is a specification.

This invention relates to a machine designed for catching and destroying boll weevils, one of the objects of the invention being to provide an adjustable machine adapted to be drawn along a row of plants straddled thereby, there being means carried by the machine for agitating the plants to dislodge the insects therefrom, and there being additional means for receiving the dislodged insects and destroying them.

Another object is to provide a structure which is adjustable in width to adapt it to plants of different sizes and to different distances between the rows, additional means being employed whereby the pans forming an essential feature of the machine, can be raised and lowered relative to the ground.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a side elevation of the machine.

Fig. 2 is a top plan view thereof, portions being broken away.

Fig. 3 is a section on line 3—3, Fig. 1.

Fig. 4 is a section on line 4—4, Fig. 3.

Referring to the figures by characters of reference 1 designates an arched axle supported by wheels 2, this axle being adjustable in the direction of its length so as to vary the distance between the wheels 2. As shown in Fig. 2 the axle is formed of two oppositely disposed angular parts the upper portions of which are extended toward each other as shown at 3 and project into a sleeve 4. Set screws 5 or the like are provided for holding the portions 3 against movement after they have been adjusted to desired positions relative to each other. The sleeve 4 constitutes one end of the main or top frame of the machine. This sleeve has arms 6 projecting forwardly from its ends and bolted or otherwise fastened to the side strips 7 of the main frame. These side strips are extended forwardly along parallel lines and then converge forwardly toward each other, as shown at 8, the converging portions merging into parallel straps or side members 9 which are bolted or otherwise fastened to the sides of a draft beam 10. To this draft beam is connected a whiffletree 11 carrying the usual single trees 12.

A cross member 13 connects the side members 7 near the front ends thereof and front and rear shafts 14 and 15 respectively are journaled in the sides of the frame as shown. The shaft 14 has an arm 16 extending therefrom and a hand lever 17 is also connected to this shaft so that the same can be rotated. An arcuate strip 18 is attached to the side of the main frame and is notched, as at 19, for engagement by a dog 20 carried by lever 17. Thus lever 17 can be held in any position to which it may be adjusted angularly.

The shaft 15 has separate arms 21 extending therefrom and a hand lever 22 is also extended from the shaft. By means of this lever the shaft 15 can be rotated to raise or lower the arms. The lever carries a dog 23 adapted to be seated in any one of the series of notches 24 formed within an arcuate strip 25. This strip is secured to the main frame and, together with strip 18, is attached to a brace strip 26 extending downwardly and forwardly from the rear portion of the side of the main frame. One of these strips 26 is located at each side of the main frame and the lower forward ends of the strips are supported by hangers 27. Rearwardly diverging braces 28 attached to the sides of the tongue 10 and extending downwardly from the tongue are also secured to the lower ends of the strips 26 and hangers 27. These strips, hangers and braces are preferably connected by a bolt 29 which also constitutes a pivot. Mounted on each of these pivot bolts is a link 30 extending forwardly and pivotally connected, as at 31, to the sides of the forward end of a housing 32. This housing is located beneath the main frame and includes a top and side walls made up of metal fabric, as indicated at 33. The metal fabric is suitably reinforced by metal strips 34 or the like placed wherever desired. The ends of the housing are normally opened and formed along the inner sides of the bottom portions of the side walls of the housing are troughs or pans 35. These troughs or pans have their walls closed but are open at the tops, the inner side walls of said troughs or pans merging upwardly toward each other but being spaced apart to provide a plant receiving passage 36 between them. The said troughs or pans are adapted to hold a suitable insecticide, such as kerosene or the like.

The housing 33 is supported by means of links 37 which are connected to the arms 16 and 21 heretofore referred to. Thus it will be seen that when the shafts 14 and 15 are rotated the housing will be raised or lowered, the links 30 serving to hold the same against longitudinal displacement relative to the main frame.

Secured within the housing at the sides thereof are strips 38 from which are extended inwardly and backwardly inclined agitating fingers 39 preferably in the form of metal rods. The fingers in the two side portions of the housing are preferably disposed in staggered relation as shown in Fig. 4.

The longitudinal edges of the pans or troughs 35 are inturned as shown at 40 and slidably mounted within each of the pans or troughs is a collecting member 41. This member is preferably formed with apertures 42 extending therethrough. A rod 43 is extended forwardly from each member and by means thereof the said member can be drawn longitudinally within the trough or pan for the purpose of collecting leaves, punctured squares, or the like deposited in the trough or pan, and dragging them toward the front end thereof where they can be readily reached and removed.

Secured to the rear portion of the housing are curtains 44 of any suitable fabric, these curtains being adapted to lap for a portion of their length, there being suitable fasteners such as the ordinary snap fasteners 45 for holding the lapping portions together. The lower edges of the curtains preferably converge upwardly so as to leave an upwardly extending space 46 through which the upper portions of the plants can pass when leaving the housing.

The sides of the housing are preferably hingedly connected to the sides of the top thereof as shown at 47. Thus the sides can be swung toward or from each other to vary the distance between the pans or troughs 35. For the purpose of holding these side walls in any positions to which they may be moved relative to each other, there is provided a telescopic connection indicated generally at 48. One member of this connection is a tube 49 secured to and extending inwardly from one of the side walls or rod 50 is extended inwardly from the other side walls to project into the tube. A set screw 51 is provided for engaging the rod to hold it against movement within the tube.

A seat for the driver is provided as shown at 52, this seat being mounted on a frame 53 slidably and pivotally connected, as at 54, to supporting strips 55. These strips are pivotally connected to the sides of the main frame and have notches 56 for the reception of studs 57 extending laterally from the frame 53. Slots 58 are formed in the strips 5 to receive the bolts or other connections 54 which thus allow the frame 53 to be adjusted longitudinally relative to the strips 55, said frame being held in adjusted position by the studs 57 in the notches 56. The strips 55 are arcuate, as shown in Fig. 1 so that this longitudinal adjustment of frame 53 will result in the raising or lowering of the seat, as will be obvious.

In using this apparatus a suitable insecticide, such as kerosene, is placed in the pans or troughs and the machine is adjusted by swinging the side walls of the housings toward or from each other to make the passage 36 of the desired width. The axle 1 is adjusted transversely to bring the wheels 2 at the proper points between the rows when the housing is straddling the row. After the adjustment of the parts the machine is drawn forwardly and the row of plants will be received in the passage 36. During the passage of the housing over the plants, said plants will be engaged and agitated by the fingers 39 which will loosen the perforated squares and insects and drop them into the pans or troughs where they will be thoroughly saturated and destroyed. As the plants leave the housing they will drag between the curtains 44. The housing can be raised or lowered by means of the levers provided for that purpose and when the pans or troughs become partially filled the scrapers 41 can be used for dragging the deposited perforated squares, etc., toward the front ends of the pans or troughs, where they can be removed readily by any suitable means.

It is to be understood that the strips 26, hangers 27 and braces 28 can be sufficiently flexible to permit the lateral angular adjustment of the sides of the housing.

What is claimed is:—

1. A device of the class described including a wheel supported frame, a vertically adjustable housing top supported from the frame, side walls hingedly connected to the sides of the top and depending therefrom, a telescopic connection between the upper portions of the walls for holding said walls fixed relative to each other at predetermined angles, troughs extending longitudinally along the inner sides of the side walls forming a plant receiving space therebetween, and agitating fingers extending toward each other from the side walls and above the respective troughs.

2. In a machine of the class described a wheel supported structure, a housing suspended therein and including a top and foraminous side walls hingedly connected to the top, parallel troughs upon the inner sides of the respective side walls forming a plant receiving space therebetween, and apertured collecting members slidable longitudinally within each trough, and operating rods attached to the respective collecting members and projecting beyond the troughs.

In testimony that I claim the foregoing as my own, I have hereto affixed my signature in the presence of two witnesses.

JOHN H. DYKES.

Witnesses:
E. B. HAY,
R. C. BROOKS,